US009009594B2

(12) United States Patent
Schwesinger et al.

(10) Patent No.: US 9,009,594 B2
(45) Date of Patent: Apr. 14, 2015

(54) CONTENT GESTURES

(75) Inventors: Mark D. Schwesinger, Bellevue, WA (US); John Elsbree, Bellevue, WA (US); Michael C. Miller, Sammamish, WA (US); Guillaume Simonnet, Bellevue, WA (US); Spencer I. A. N. Hurd, Seattle, WA (US); Niels van Dongen, Shaw Island, WA (US); Evan J. Lerer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 12/854,708

(22) Filed: Aug. 11, 2010

(65) Prior Publication Data

US 2012/0042246 A1    Feb. 16, 2012

Related U.S. Application Data

(60) Provisional application No. 61/353,626, filed on Jun. 10, 2010.

(51) Int. Cl.
*G06F 3/00* (2006.01)
*G06F 3/01* (2006.01)
*G11B 27/10* (2006.01)
*H04N 21/4223* (2011.01)

(52) U.S. Cl.
CPC ............. *G06F 3/017* (2013.01); *G11B 27/105* (2013.01); *H04N 21/4223* (2013.01)

(58) Field of Classification Search
USPC ........................................ 715/716, 851, 838
See application file for complete search history.

(56) References Cited

U.S. PATENT DOCUMENTS

| 5,594,469 | A  | * | 1/1997 | Freeman et al. ............. 345/158 |
| 6,904,561 | B1 | * | 6/2005 | Faraday et al. .............. 715/202 |
| 6,990,637 | B2 | * | 1/2006 | Anthony et al. ............. 715/851 |
| 8,238,287 | B1 | * | 8/2012 | Gopi et al. .................... 370/328 |
| 2003/0095154 | A1 | | 5/2003 | Colmenarez |
| 2005/0212753 | A1 | * | 9/2005 | Marvit et al. ................ 345/156 |
| 2006/0010400 | A1 | * | 1/2006 | Dehlin et al. ................ 715/856 |
| 2006/0064300 | A1 | | 3/2006 | Holladay |
| 2006/0184684 | A1 | * | 8/2006 | Weiss et al. .................. 709/231 |
| 2006/0209021 | A1 | | 9/2006 | Yoo et al. |
| 2008/0077866 | A1 | | 3/2008 | Margulis |

(Continued)

FOREIGN PATENT DOCUMENTS

| CN | 1672405 | 9/2005 |
| CN | 101501614 | 8/2009 |
| CN | 101702941 | 5/2010 |

OTHER PUBLICATIONS

"International Search Report", Mailed Date: Feb. 9, 2012, Application No. PCT/US2011/038478, Filed Date: May 30, 2011, pp. 9.

(Continued)

*Primary Examiner* — William Bashore
*Assistant Examiner* — Sherrod Keaton
(74) *Attorney, Agent, or Firm* — Gregg Wisdom; Judy Yee; Micky Minhas (57) ABSTRACT

Content gestures are described. In implementations, one or more controls are output to control output of content and for display in a user interface by a computing device. An input is recognized, by the computing device, which was detected using a camera as a gesture to interact with a particular one of the controls to control the output of the content.

20 Claims, 9 Drawing Sheets

(56) References Cited

U.S. PATENT DOCUMENTS

| | | |
|---|---|---|
| 2008/0126937 A1* | 5/2008 | Pachet .................... 715/720 |
| 2008/0134036 A1 | 6/2008 | Kapur et al. |
| 2008/0165141 A1* | 7/2008 | Christie .................. 345/173 |
| 2009/0183125 A1 | 7/2009 | Magal et al. |
| 2010/0150520 A1* | 6/2010 | Hopwood et al. ......... 386/52 |
| 2010/0235786 A1* | 9/2010 | Maizels et al. ........... 715/810 |
| 2010/0281372 A1* | 11/2010 | Lyons et al. ............. 715/720 |
| 2011/0107216 A1* | 5/2011 | Bi ......................... 715/716 |

OTHER PUBLICATIONS

Haro, et al., "Mobile Camera-Based Adaptive Viewing", Retrieved at << http://www.google.co.in/url?sa=t&source=web&ct=res&cd=3&ved=0CCMQFjAC&url=http%3A%2F%2Fciteseerx.ist.psu.edu%2Fviewdoc%2Fdownload%3Fdoi%3D10.1.1.89.8714%26rep%3Drep1%26type%3Dpdf&rct=j&q=%22Mobile+Camera-Based+Adaptive+Viewing%22&ei=LqkETMTnIJ_-0gTn1an3Ag&usg=AFQjCNFG7KjbyUhmJIqA7jD7K48NTgiPqQ&sig2=GsfrZZH32UPuWKH2u- , (Dec. 2005, pp. 1-6).

"Menu window—Scene Selection menus—Film Strip", Retrieved at << http://www.mediachance.com/dvdlab/Helppro/filmstrip.htm >>, Retrieved Date : Jun. 1, 2010, pp. 1-3.

"Look Ma'—no Cursor", Retrieved at << http://uncharted.designmap.com/ >>, Jun. 2, 2009, pp. 1-17.

Reisinger, Don., "PS3 Motion Controller pushed back to fall", Retrieved at << http://news.cnet.com/8301-13506_3-10437784-17.html >>, Jan. 20, 2010, pp. 2.

"FlingPC—Best Bluetooth gamepad for the PC", Retrieved at << http://www.prlog.org/10701301-flingpc-best-bluetooth-gamepad-for-the-pc.html >>, May 27, 2010, pp. 2.

Hartman, Michael., "Immersion over Interaction: Problems and Limitations with the Wii Motion Controller", Retrieved at << http://www.brighthub.com/video-games/wii/articles/68753.aspx?p=2 >>, Apr. 15, 2010, pp. 2.

Baker, Gregory., "Augmented Reality becoming, umm a Reality", Retrieved at << http://uncharted.designmap.com/?p=195 >>, Jul. 8, 2009, p. 1.

Stein, Scott., "The future 360: Project Natal takes shot at Wii", Retrieved at << http://news.cnet.com/8301-17938_105-10253586-1.html >>, Jun. 1, 2009, pp. 5.

"Foreign Office Action", CN Application No. 201180028086.3, Dec. 2, 2014, 17 pages.

* cited by examiner

802
Recognize an input that was detected using a camera as a gesture to initiate a mode to control output of content

↓

804
Output one or more controls, to control output of content, for display in a user interface by a computing device

↓

806
Recognize an input, by the computing device, that was detected using a camera as a gesture to interact with one or more controls to control the output of the content 808
Recognize the input as selecting a marker in a seekbar that is manipulable via the gesture to specify a position in the output of the content 810
Responsive to the recognition of the selection, zoom a display of the seekbar to show an amount of time in greater detail in comparison to a display of the seekbar before the recognition of the selection 812
Output a thumbnail view of the content that corresponds to a point in time in the output of the content indicated by the marker responsive to movement of the marker described by the input

CONTENT GESTURES

RELATED APPLICATIONS

The application claims priority to U.S. Provisional Patent Application No. 61/353,626, filed on Jun. 10, 2010, and titled "Motion Based Media Controls," the disclosure of which is hereby incorporated by reference in its entirety.

BACKGROUND

User may have access to a variety of different devices to interact with media. For example, a user may utilize a cursor control device to interact with media output by a desktop computer, a remote control device to interact with media on a television and so on. Consequently, each one of these different devices may have a different layout of buttons that support different features, which may be confusing to the user.

Further, some of the devices may be misplaced and difficult to relocate. For instance, a user may misplace a remote control device for a television. Additionally, the remote control device may be configured as a primary input device for the television such that some functions are available exclusively through use of the remote control device. Accordingly, the user may spend a significant amount of time in trying to find the device, which may lead to user frustration and a diminished user experience.

SUMMARY

Content gestures are described. In implementations, one or more controls are output to control output of content and for display in a user interface by a computing device. An input is recognized, by the computing device, which was detected using a camera as a gesture to interact with a particular one of the controls to control the output of the content.

In implementations, an input is recognized, by a computing device, which was detected using a camera as a gesture to select a marker in a seekbar, the marker describing a position in an output of content described by the seekbar. Responsive to the recognizing, a display of the seekbar is zoomed by the computing device to display an amount of time in the playback of the media in greater detail.

In implementations, one or more computer-readable media comprise instructions that, responsive to execution on a computing device, cause the computing device to perform operations comprising outputting a seekbar to control playback of media by the computing device and recognizing an input that was detected using a camera as a gesture to select a particular point in the playback of the media through interaction with the seekbar.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Remote control devices were developed to aid users to navigate through output of content. However, the devices may be frequently misplaced or located far away from the user when the user desires to control output of the content, such as to playback particular television show. This may be inefficient for the user as the user may have a difficult time locating the remote control and a difficult time navigating to a desired position within the content.

In implementations, a computing device provides users with the ability to control content output using gestures. For example, the user may use a hand gesture to engage a seekbar system, a second hand gesture to drag a handle on the seekbar to change a position at which the content is to be output, and then use a third hand gesture to start playback of the content. This allows the user to control content output without directly interacting with a remote control device (e.g., pressing physical buttons) or other device.

In addition, the seekbar may provide zoom functionality to permit increased control for user selections. For example, a user may select a marker in a seekbar that indicates a current position within a playback of media to be output. Responsive to this selection, the seekbar may show at least a portion of the seekbar in greater detail. In this way, the user can refine their selection on the seekbar automatically.

Further, the seekbar may also include thumbnail previews of the media at different positions along the seekbar. For example, the user may move the marker along the seekbar. In response, the computing device may provide an output of thumbnails that correspond to the locations in the playback of the media through which the marker is moved. This gives the user a quick view of media content without forcing the user to abandon the current media being viewed, which may be displayed as a background. A variety of other functionality is contemplated, further discussion of which may be found in relation to the following sections.

In the following discussion, an example environment is first described that is operable to employ the media playback control techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
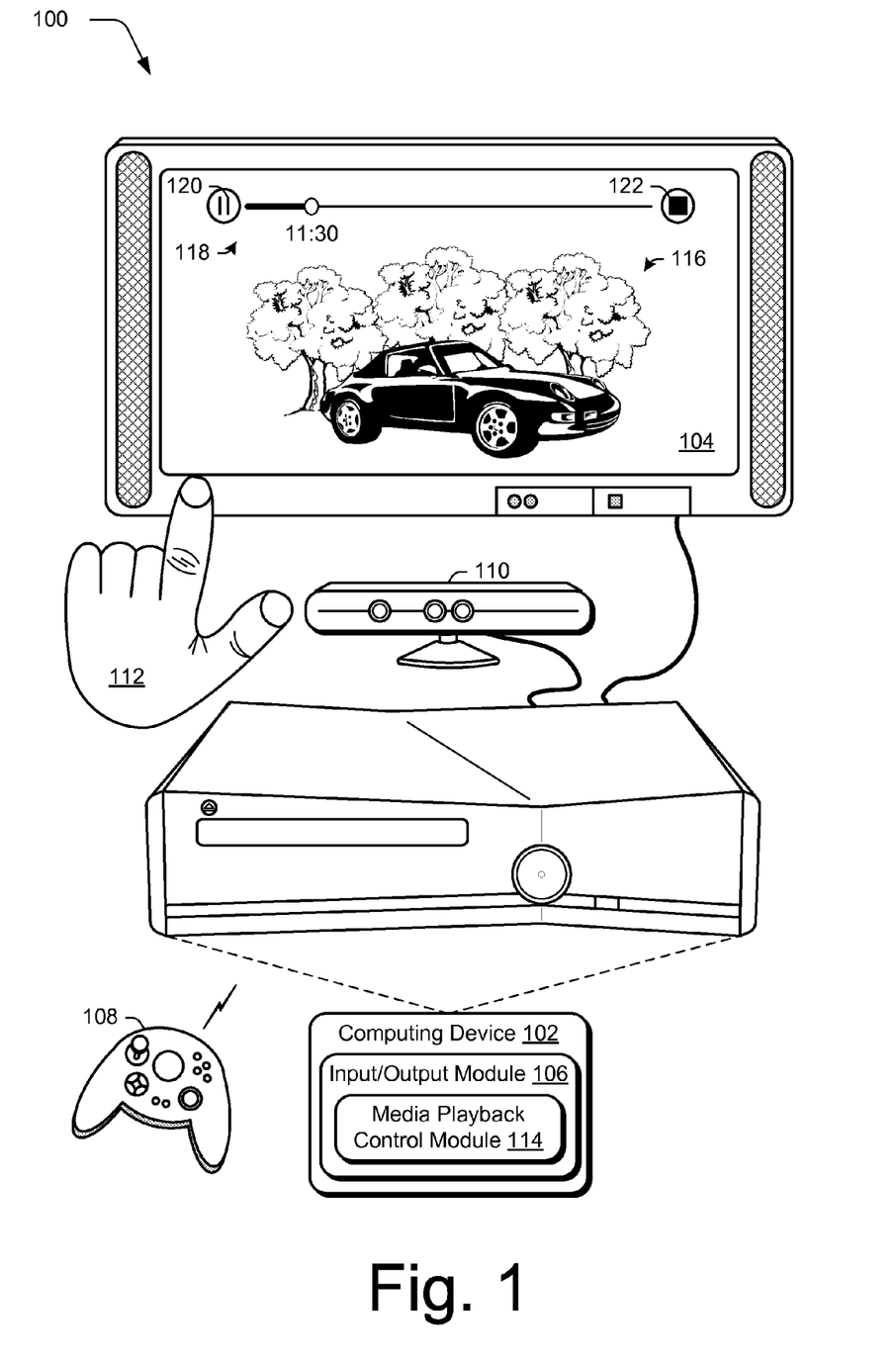
FIG. 1 is an illustration of an environment in an example implementation that is operable to employ content output techniques described herein.

FIG. 1 is an illustration of an environment 100 in an example implementation that is operable to employ content output techniques. Although the following describes output of media (e.g., video, music, television shows), these techniques may be employed for a variety of other types of content, such as pages in a document, collections of pictures, and so on. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a game console communicatively coupled to a display device 104 (e.g., a television) as illustrated, a wireless phone, a netbook, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input/output module 106. The input/output module 106 is representative of functionality relating to recognition of inputs and/or provision of outputs by the computing device 102. For example, the input/output module 106 may be configured to receive inputs from a keyboard, mouse, to identify gestures and cause operations to be performed that correspond to the gestures, and so on. The inputs may be detected by the input/output module 106 in a variety of different ways.

The input/output module 106 may be configured to receive one or more inputs via touch interaction with a hardware device, such as a controller 108 as illustrated. Touch interaction may involve pressing a button, moving a joystick, movement across a track pad, use of a touch screen of the display device 104 (e.g., detection of a finger of a user's hand or a stylus), and so on. Recognition of the touch inputs may be leveraged by the input/output module 106 to interact with a user interface output by the computing device 102, such as to interact with a game, an application, browse the internet, change one or more settings of the computing device 102, and so forth. A variety of other hardware devices are also contemplated that involve touch interaction with the device. Examples of such hardware devices include a cursor control device (e.g., a mouse), a remote control (e.g. a television remote control), a tablet computer, a mobile communication device (e.g., a wireless phone configured to control one or more operations of the computing device 102), and other devices that involve touch on the part of a user or object.

The input/output module 106 may also be configured to provide a natural user interface (NUI) that may recognize interactions that do not involve touch. For example, the computing device 102 may include a NUI input device 110. The NUI input device 110 may be configured in a variety of ways to detect inputs without having a user touch a particular device, such as to recognize audio inputs through use of a microphone. For instance, the input/output module 106 may be configured to perform voice recognition to recognize particular utterances (e.g., a spoken command) as well as to recognize a particular user that provided the utterances.

In another example, the NUI input device 110 that may be configured to recognize gestures, presented objects, images, and so on through use of a camera. The camera, for instance, may be configured to include multiple lenses so that different perspectives may be captured. The different perspectives may then be used to determine a relative distance from the NUI input device 110 and thus a change in the relative distance. The different perspectives may be leveraged by the computing device 102 as depth perception. The images may also be leveraged by the input/output module 106 to provide a variety of other functionality, such as techniques to identify particular users (e.g., through facial recognition), objects, and so on.

The input-output module 106 may leverage the NUI input device 110 to perform skeletal mapping along with feature extraction of particular points of a human body (e.g., 48 skeletal points) to track one or more users (e.g., four users simultaneously) to perform motion analysis. For instance, the NUI input device 110 may capture images that are analyzed by the input/output module 106 to recognize one or more motions and/or positioning of body parts or other objects made by a user, including what body part is used to make the motion as well as which user made the motion. An example is illustrated through recognition of positioning and movement of one or more fingers of a user's hand 112 and/or movement or positioning of the user's hand 112 as a whole. The motions and/or positioning may be identified as gestures by the input/output module 106 to initiate a corresponding operation.

A variety of different types of gestures may be recognized, such a gestures that are recognized from a single type of input as well as gestures involving multiple types of inputs, e.g., a hand gesture and voice recognition. Thus, the input/output module 106 may support a variety of different gesture techniques by recognizing and leveraging a division between inputs. It should be noted that by differentiating between inputs in the natural user interface (NUI), the number of gestures that are made possible by each of these inputs alone is also increased. For example, although the movements may be the same, different gestures (or different parameters to analogous commands) may be indicated using different types of inputs. Thus, the input/output module 106 may provide a natural user interface the NUI that supports a variety of user interactions that do not involve touch.

Accordingly, although the following discussion may describe specific examples of inputs, in instances different types of inputs may also be used without departing from the spirit and scope thereof. Further, although in instances in the following discussion the gestures are illustrated as being input using a NUI, the gestures may be input using a variety of different techniques by a variety of different devices, such as to employ touchscreen functionality of a tablet computer or mobile communications device, e.g., a wireless phone.

The computing device 102 is further illustrated as including a media playback control module 114 that is representative of functionality relating to control of media playback. For example, the media playback control module 114 may be configured to accept inputs from a controller 108 and/or NUI input device 110 to control output of media by the computing device 102, such as the media 116 that is currently being displayed in this example. As illustrated on the display device 104, for instance, the media playback control module 114 may display one or more controls that are selectable to control playback of media, such as a seekbar 118 and other controls, examples of which include a display of a pause button 120 and a stop button 122.

By interacting with these controls, a user is able to control output of content by the computing device and in implementations may do so indirectly (e.g., without physically handling another device) via one or more gestures that are recognized by the media playback control module 114. Thus, the media playback control module 114 may be used to support natural interaction with the computing device 102 to control output of the media 116, further discussion of which may be found in relation to the implementation examples below.

Again, although media is described in this example in relation to the techniques described herein, these techniques may be leveraged for a variety of other purposes to control output of content. For example, the seekbar 118 may be used to "scrub" pages in a document (e.g., thumbnails may represent chapter header pages as further described below), a set of pictures, position on a map, and so on. Accordingly, units displayed by the seekbar may be configured in a variety of ways, such as discrete number (e.g., page numbers in a document), distance (e.g., distance from start in a street view navigation application), logarithmic zoom scale, non-numeric scales (e.g., categories such as movie genre), and so on.

Figure 2:
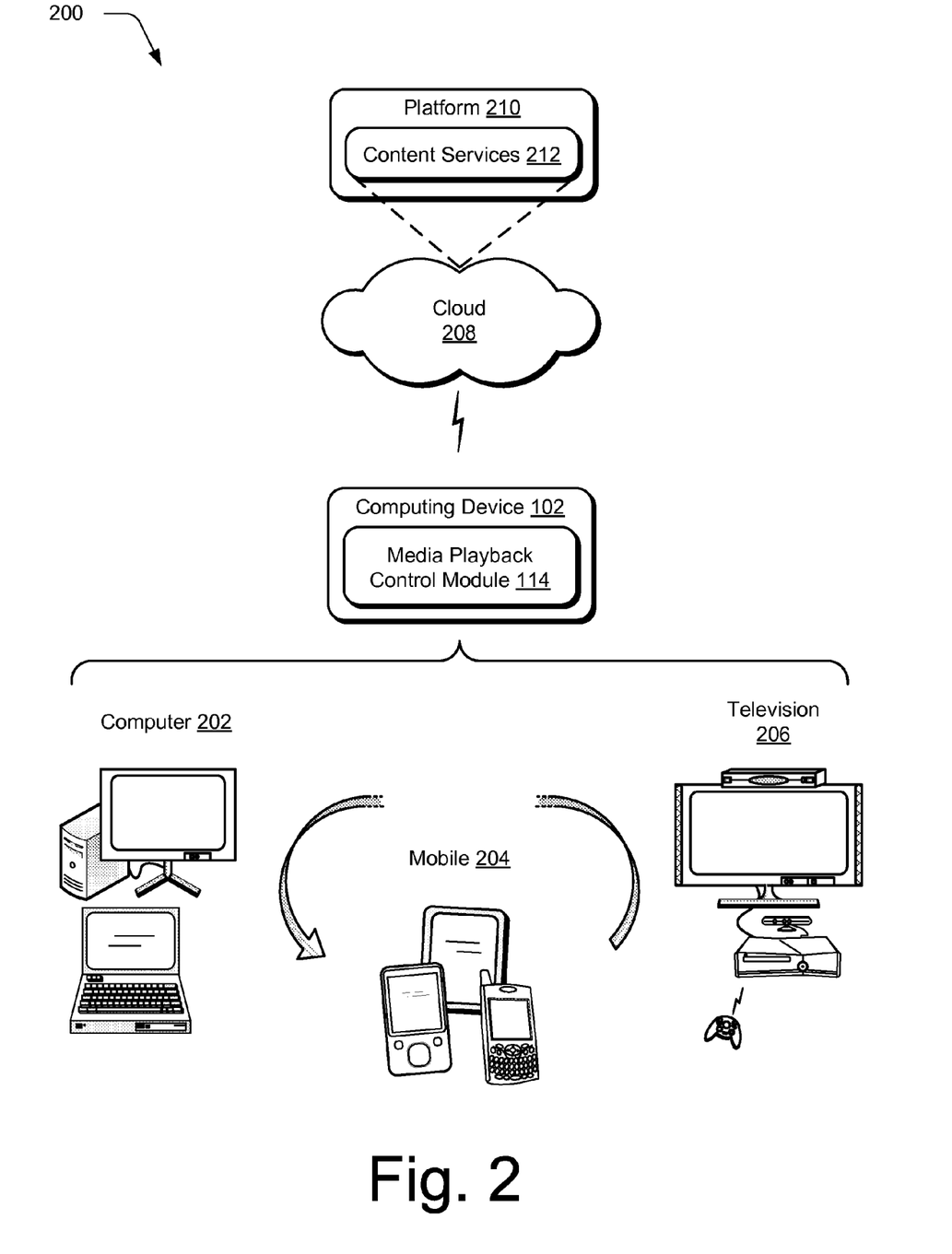
FIG. 2 illustrates an example system showing a media playback control module of FIG. 1 as being implemented in an environment where multiple devices are interconnected through a central computing device.

FIG. 2 illustrates an example system 200 that includes the computing device 102 as described with reference to FIG. 1. The example system 200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the client device 102 may assume a variety of different configurations, such as for computer 202, mobile 204, and television 206 uses. Each of these configurations includes devices that may have generally different constructs and capabilities, and thus the computing device 102 may be configured according to one or more of the different device classes. For instance, the computing device 102 may be implemented as the computer 202 class of a device that includes a personal computer, desktop computer, a multi-screen computer, laptop computer, netbook, and so on.

The computing device 102 may also be implemented as the mobile 202 class of device that includes mobile devices, such as a mobile phone, portable music player, portable gaming device, a tablet computer, a multi-screen computer, and so on. The computing device 102 may also be implemented as the television 206 class of device that includes devices having or connected to generally larger screens in casual viewing environments. These devices include televisions, set-top boxes, gaming consoles, and so on. The media playback control techniques described herein may be supported by these various configurations of the client device 102 and are not limited to the specific examples of media playback control techniques described herein.

The cloud 208 includes and/or is representative of a platform 210 for content services 212. The platform 210 abstracts underlying functionality of hardware (e.g., servers) and software resources of the cloud 208. The content services 212 may include applications and/or data that can be utilized while computer processing is executed on servers that are remote from the client device 102. Content services 212 can be provided as a service over the Internet and/or through a subscriber network, such as a cellular or Wi-Fi network.

The platform 210 may abstract resources and functions to connect the computing device 102 with other computing devices. The platform 210 may also serve to abstract scaling of resources to provide a corresponding level of scale to encountered demand for the content services 212 that are implemented via the platform 210. Accordingly, in an interconnected device embodiment, implementation of functionality of the media playback control module 114 may be distributed throughout the system 200. For example, the media playback control module 114 may be implemented in part on the computing device 102 as well as via the platform 210 that abstracts the functionality of the cloud 208.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the media playback control techniques described below are platform-independent, meaning that the techniques may be implemented on a variety of commercial computing platforms having a variety of processors.

Media Playback Control Implementation Example

Figure 3:
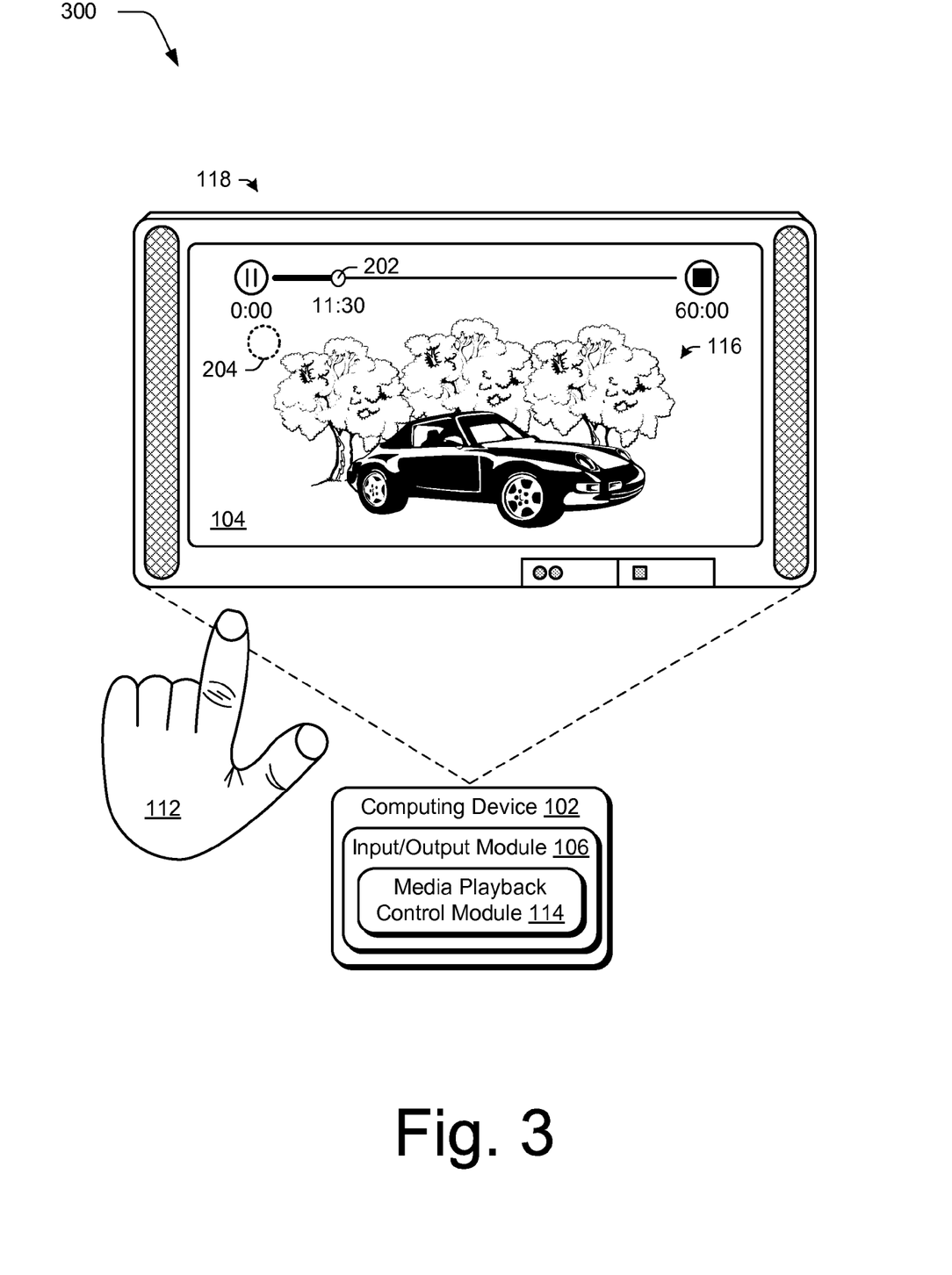
FIG. 3 is an illustration of an example system in which a gesture is used to initiate a mode to interact with media controls to control playback of media by the computing device of FIG. 1.

FIG. 3 illustrates an example system 300 in which a gesture is used to initiate a mode to interact with media controls to control playback of media by the computing device 102 of FIG. 1. In this implementation, the seekbar 118 is displayed for viewing by a user on the display device 104 and is displayed concurrently with an output of the media 116. Although displayed above the media, the seekbar 118 may be displayed in a variety of locations and using a variety of techniques on the display device 104 as desired, such as the bottom or sides of the display using various amount of opacity to maintain a view of the current media being displayed to a user.

The seekbar 118 in this example describes a total duration of playback of an item of media, which is a one hour television show in this example but other media items are also contemplated, such as music, video (stored locally or streamed over a network), games, and so on. Other examples are also contemplated, such as to display an amount of time in playback of an item of media that is less than a total duration taken to output the media, such as elapsed time for streaming a video, playing a game, and so forth.

The seekbar 118 also includes a marker 202 that indicates a current position in an output of the media 116 and thus may also be referenced in the following discussion as a current position marker 202. This allows the user to see how much media has been viewed and the amount of content that is currently playable, such as for progressive downloads, live playback, or other embodiments. Accordingly, the amount of media that is currently playable may change with time. The quality of the media playback may also be displayed in the seekbar.

To initiate interaction with the seekbar 118, a user may make a gesture that indicates that the user desires to interact with the media control functionality of the media playback control module 114. In this way, the media playback control module 114 may help to limit recognition of inadvertent gestures made by the user. As described above, a gesture may be defined as movement and/or be a position of a hand or other bodily part of the user. Thus, a variety of different gestures may be supported by the media playback control module 114 to enter a media playback control mode.

In this example, an indication 204 is also displayed in the user interface to indicate a position of the display device 104 that corresponds to the user's hand as recognized by the media playback control module 114. In this way, the media playback control module 114 may provide feedback to a user to assist the user in navigating through the user interface. In this example system 300 a user has made a gesture to initiate a mode to interact with one or more media controls. Example interaction with the one or more media controls is further described in relation to the following figure.

Figure 4:
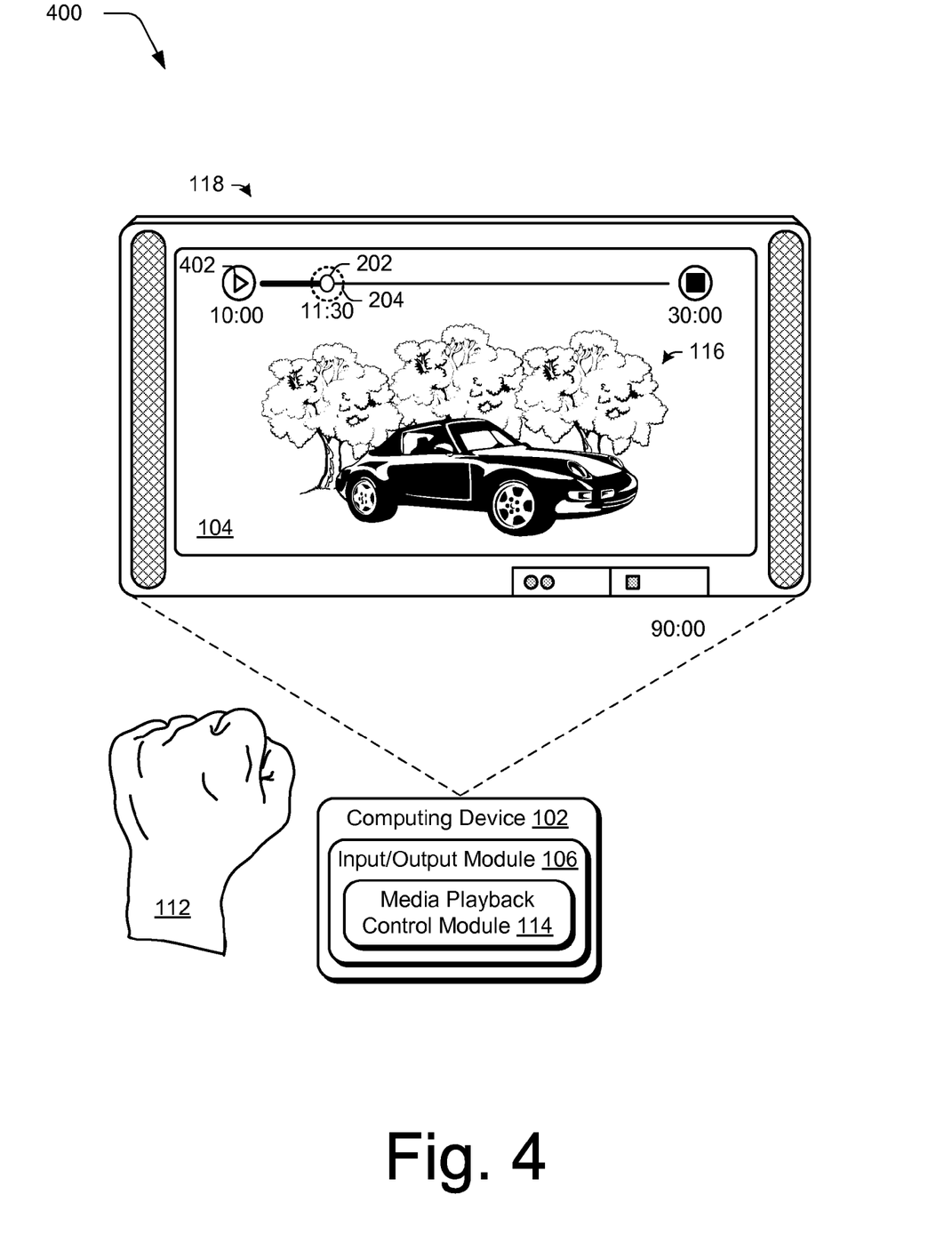
FIG. 4 is an illustration of an example system in which a gesture is used to initiate interaction with a media controls configured as a seekbar to control playback of media by the computing device of FIG. 1.

FIG. 4 illustrates an example system 400 in which a gesture is used to initiate interaction with a media controls configured as a seekbar to control playback of media by the computing device 102 of FIG. 1. In this example, the current position marker 202 is engaged using a gesture made by the user's hand 112. In this instance, the user's hand 112 is illustrated as making a grab motion by making a fist when the indication 204 is disposed with the current position marker 202 in the user interface. When the current position marker 202 is engaged, playback of the media may be paused. Thus, the pause button 120 may change to a play button 402 in the user interface so that it is selectable to initiate playback of the media 116 again, although other embodiments are also contemplated such as through another gesture. Alternatively, when the current position marker is engaged, the user may perform another hand movement to pause the media.

In addition, the seekbar 118 may provide for greater control for user selections by providing "zooming" functionality. After the current position marker 202 is selected, for instance, the seekbar 302 may zoom in to show a section (e.g., of the amount of time) of the overall media 116 in greater detail. As shown in FIG. 3, for example, the seekbar 118 is illustrated as representing an amount of time from zero to sixty minutes, whereas the amount of time represented by the seekbar 118 in FIG. 4 is from ten to thirty minutes and thus allows for a finer granularity in selecting a particular time using the seekbar 118.

The amount of time represented by the seekbar 118 when "zooming" may be configured in a variety of ways, such as a percentage of the overall duration of the media playback, a set interval, and so on. Additionally, if the configured amount of time is less than the time for the overall media, a zoom may not be performed.

In an implementation, the configured amount of time may be consistent, such that the area from left to right represents the same amount of time. Additionally, the seekbar 118 may expand across the display device 104, such as expand to fill the width of the display device 104 to provide even greater detail. Thus, the zooming functionality may provide the user with a more refined selection on the seekbar 302 through selection of particular positions in the playback of the media 116 in greater detail. Thus, in this example system 400 a user has selected the marker 202 of the seekbar 118, which may then be moved to select a position in the seekbar 118 for output of corresponding media 116 as further described in the next figure.

Figure 5:
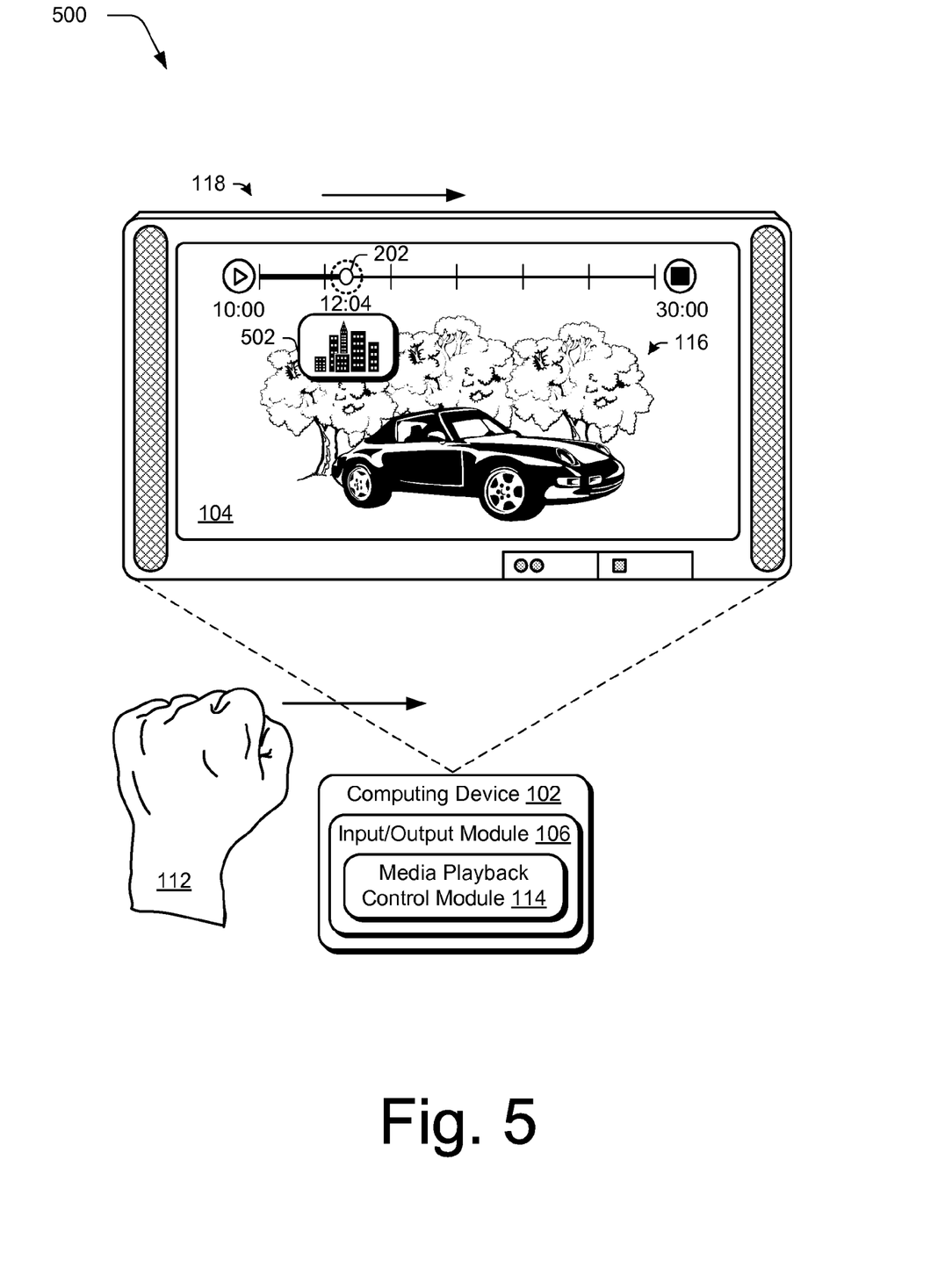
FIG. 5 illustrates an example system in which another gesture is used to move a marker of the seekbar selected in the example implementation of FIG. 4 to control playback of media.

FIG. 5 illustrates an example system 500 in which another gesture is used to move a marker of the seekbar selected in the example implementation of FIG. 4 to control playback of media. When the user is engaged with the current position marker 202, the user may move the marker 202 right or left by performing gestures. In an implementation, moving the marker 202 on the seekbar 118 to different positions, or scrubbing, allows a user to move within media 116 to different positions in the playback of the media. As shown in the example system 500 of FIG. 5, for instance, the user's hand 112 is indicated as moving to the right through the use of an arrow. Accordingly, the marker 202 is moved by the media playback control module 114 to the right along the seekbar 118 as also illustrated using an arrow. Thus, the seekbar 118 may act as a media timeline that describes the playback of the media 116.

Scrubbing may include a variety of other techniques. In an example, if the user scrubs to the edge of the seekbar 118 on the display device 104, the seekbar 118 may automatically scroll to bring in another section of the timeline. Furthermore, if the user scrubs until the end of the timeline, the scrolling may stop. In another embodiment, a user's hand 112 motion may be leveraged by the media playback control module 114 to determine scrolling speed. For example, if the user's hand 112 motion is far to the left, the scrolling speed to the left may be faster. Scrolling speed and other characteristics of scrolling may also be configured by the user.

The media playback control module 114 is also illustrated as providing a thumbnail 502 preview of the media 116 at different positions along the seekbar 118 that corresponds to positions of the marker 202 when moved. For example, the thumbnail 502 of FIG. 5 includes an image taken from the media at a point "12:04" in the playback of the media. This gives the user a quick visual of media at positions along the seekbar 118 without forcing the user to abandon the current media 116 being viewed.

Figure 6:
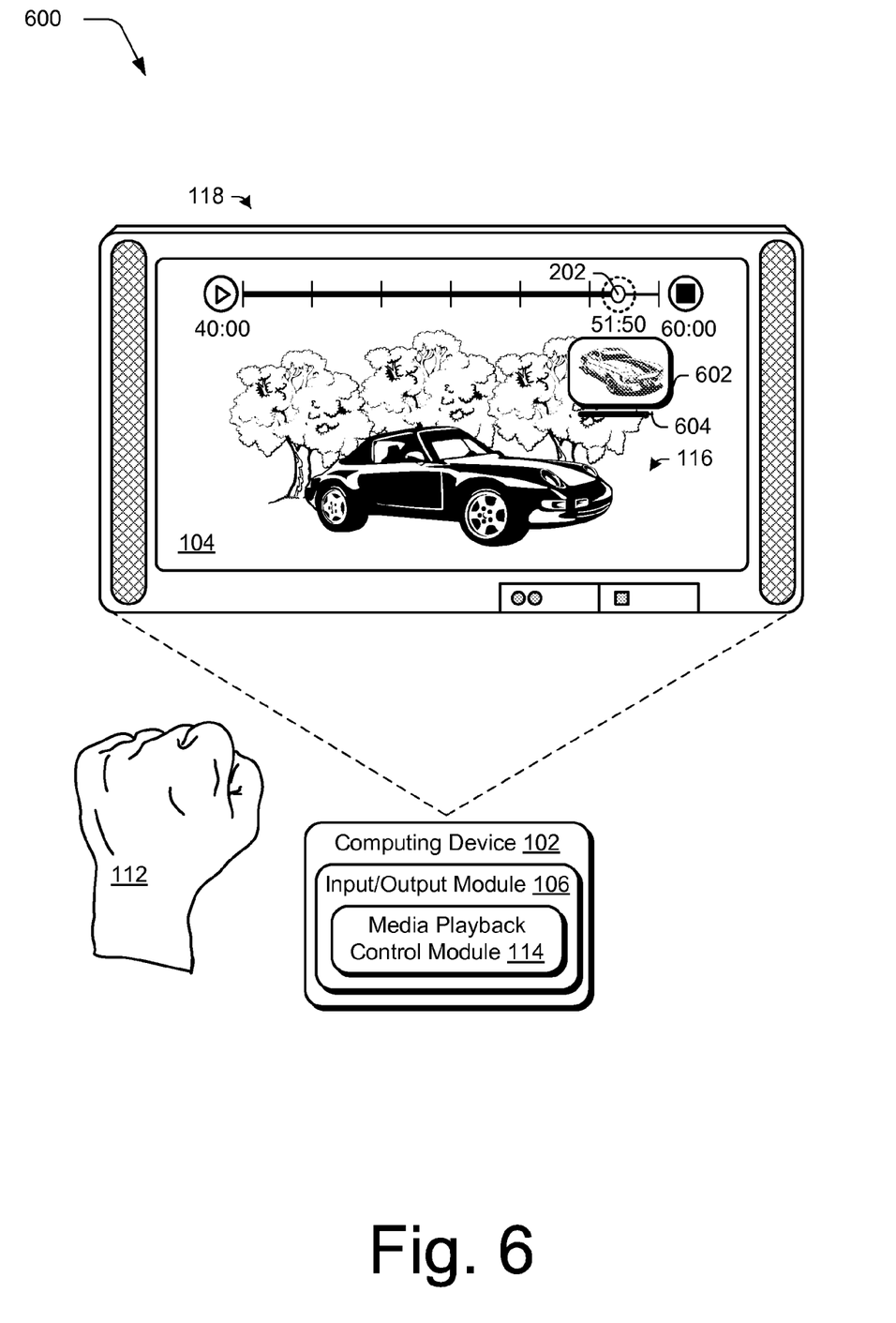
FIG. 6 illustrates an example system in which navigation along the seekbar is continued from the system of FIG. 5.

FIG. 6 is a system 600 in an example implementation in which navigation along the seekbar 118 is continued from the system 500 of FIG. 5. As illustrated, the user's hand 112 has continued to move to the right. Accordingly, the marker 202 has been moved a corresponding amount by the media playback control module 114. Further, the seekbar 118 in this example describes a new interval to time from forty minutes to sixty minutes in the playback of the media 116. As described above, for instance, the marker 202 may be navigated to an edge of the seekbar 118 which may cause a new interval of time in the playback to be represented.

Figure 7:
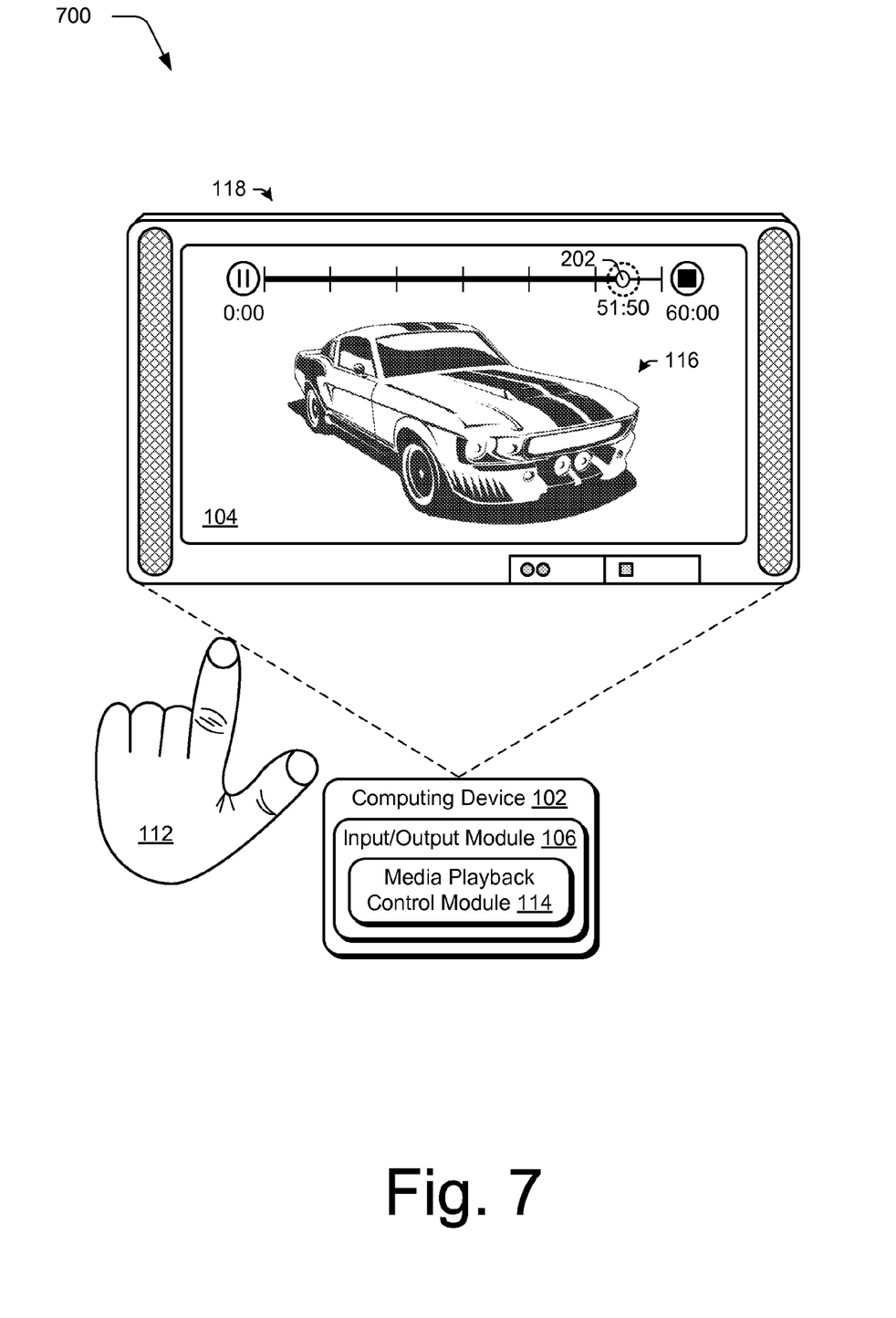
FIG. 7 illustrates an example system in which a position in a seekbar is selected for output of media.

A thumbnail 602 is again displayed proximally to the marker 202 and includes an image taken from the media 116 at that point in time during the playback. In this instance, the current position of the marker 202 is desired for viewing by the user. The thumbnail 602 is also illustrated as including an "un-zoomed" representation 602 of the seekbar 118 such that a user may "keep track of their place" in the overall playback of the media. Accordingly, as shown in the system 700 of FIG. 7 the user may perform a gesture to disengage from the seekbar (opening of the grasping motion of the user's hand 112) and start media playback from the frame in the thumbnail 602. The thumbnail 602 of FIG. 6 is zoomed into full screen and media 116 playback may continue from the thumbnail frame.

In an implementation, a user may perform a scrub gesture faster than the thumbnails can be fetched and rendered by the computing device 102. In such an implementation, the thumbnails may be output as a blur animation of images. In another implementation, the thumbnail preview might be hidden and as such the current position is shown, solely. Additionally, the user may configure the system to disable thumbnail preview without departing from the spirit and scope thereof.

The seekbar 118 as illustrated may also contain indicators of particular points in time in the output of the media, e.g., chapter marks that appear on the seekbar 118 as tick marks in the illustrated example but may assume a variety of other characteristics. The indicators may be located at commonly referenced points in playback of the media 116 (e.g. after a commercial, after a certain number of pictures), at a configurable time increment, and so on.

Additionally, the indicators may utilize a certain "gravity" or "stickiness" by the media playback control module 114 to promote selection of the indicators 114. For example, the media playback control module 114 may be configured to position the marker 202 at the indicator which the marker 202 is released within a predefined range of the indicator. Thus, when a user drags the marker 202 of the seekbar 118 across indicators within the media 116, the media playback control module 114 may "pull" the selection towards the indicators. This allows the user to select an indicator with ease. In implementations, the indicators may be configured by the user to increase or decrease pull on the marker 202 of the seekbar 118.

The media playback control module 114 may provide feedback to the user in a message field located in the user interface. For example, if the computing device 102 changes state, the message field may inform the user and if the user tries to perform an action that is not supported, the message field may display "action not supported" message. Some example state changes include: play, pause, fast forward (e.g., 2×, 4×, 8×, 16×, 32×), rewind (e.g., 2×, 4×, 8×, 16×, 32×), and so on. Additionally, the message field may display symbols to communicate information to the user.

The media playback control module 114 may support a variety of other functionality in relation to the seekbar 118. For example, a user may detach from the seekbar 118 and return to displayed media 116. In an example, a user may perform a motion to start playback at a current handle. In another example, a user may perform a motion to leave the marker 202 at a current position without playback. Additionally, if the user does not interact with the computing device 102 for a duration of time, the device may automatically timeout and remove the controls from display on the display device 104.

In another implementation, a user may make a motion to select other controls on the display device 104. A variety of different controls and corresponding gesture may be supported such as stop, skip forward, skip backward, pause, or play. Skip forward and backward may involve a specified duration of time, chapter skipping, content skipping, and so forth. Additionally, the media playback control module 114 may be configured to permit user specification of controls. Further, controls may be enabled when the media is in a certain state, e.g. skip controls are enabled when the content is paused and are not enabled otherwise. A variety of different controls may be supported by the media playback control module, examples of which may be found in relation to the following section.

In an embodiment, the media playback control module 114 is implemented to provide a user interface for controlling playback of time-based media. The media playback control module 114 may process user input and display onscreen overlays that are configured for interaction by the user. Sources of user input may include controllers (e.g., controller 108), remote controls, an NUI input device 110 (e.g., a motion detector camera), and so on. Onscreen overlays may include a progress bar, status messages, and visible controls for the user to manipulate.

The media playback control module 114 may provide an application programming interface (API) to an application. As such, the application itself may be responsible for the actual rendering of media and managing its transport states, but not concern itself with the specifics of the user experience for controlling the media playback.

Although a few examples of media controls were described for the seekbar 118, the seekbar 118 may support a variety of other functionality related to playback. For example, the seekbar 118 may include a download indicator, describe elapsed and remaining time, and include a quality meter. For example, the quality meter may involve a visual representation of the quality (fidelity) of the media content currently being rendered. The quality may be used for streaming media, when quality may vary due to bandwidth conditions, and may also be used to distinguish standard definition versus high definition quality on downloaded media.

Other controls are also contemplated, such as a transport button bar that includes transport controls such as play/pause, previous chapter, rewind, stop, fast forward, next chapter, display mode, audio language, subtitle language, and info. Additionally, one or more of the controls may be initiated through use of the controller 108, such left/right focus navigation of a transport button bar, use of an "A" button to invoke the zooming functionality, and so on.

Thus, as shown in FIGS. 3-7, as user approaches the marker 202, the seekbar 118 "zooms in," giving the user higher precision in selecting a position. As the seekbar 118 zooms, its original position may adjusted to maintain the marker 202 in the same relative position on the display device 104. Both the seekbar's 118 height and width may scale to achieve a desired degree of zoom. When the marker 118 is selected (e.g., attached), playback of the media may be paused automatically.

The marker 202 may move smoothly along the entire seekbar 118, but the time indicator and thumbnail may also "snap" to specific time indications (e.g., at 15 second intervals) or to a chapter position, whichever is nearer. Dragging to extreme left or right may cause the seekbar 118 to scroll (until beginning or end of the media 116 is reached). While attached, a thumbnail 402 of currently selected position of the marker 202 may be displayed as shown in FIG. 4. When the marker 202 is detached (e.g., the user's hand 112 is lowered as a gesture or other gesture as described in relation to FIG. 7), media 116 that corresponds to the current position of the marker 202 is played back. Additionally, when the marker 202 is detached, other media controls may be disabled and left disabled until a short delay (e.g., one second) after detach to reduce accidental attachment to other media controls during the detach gesture.

Example Procedure

The following discussion describes media playback control techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200-700 of FIGS. 2-7.

Figure 8:
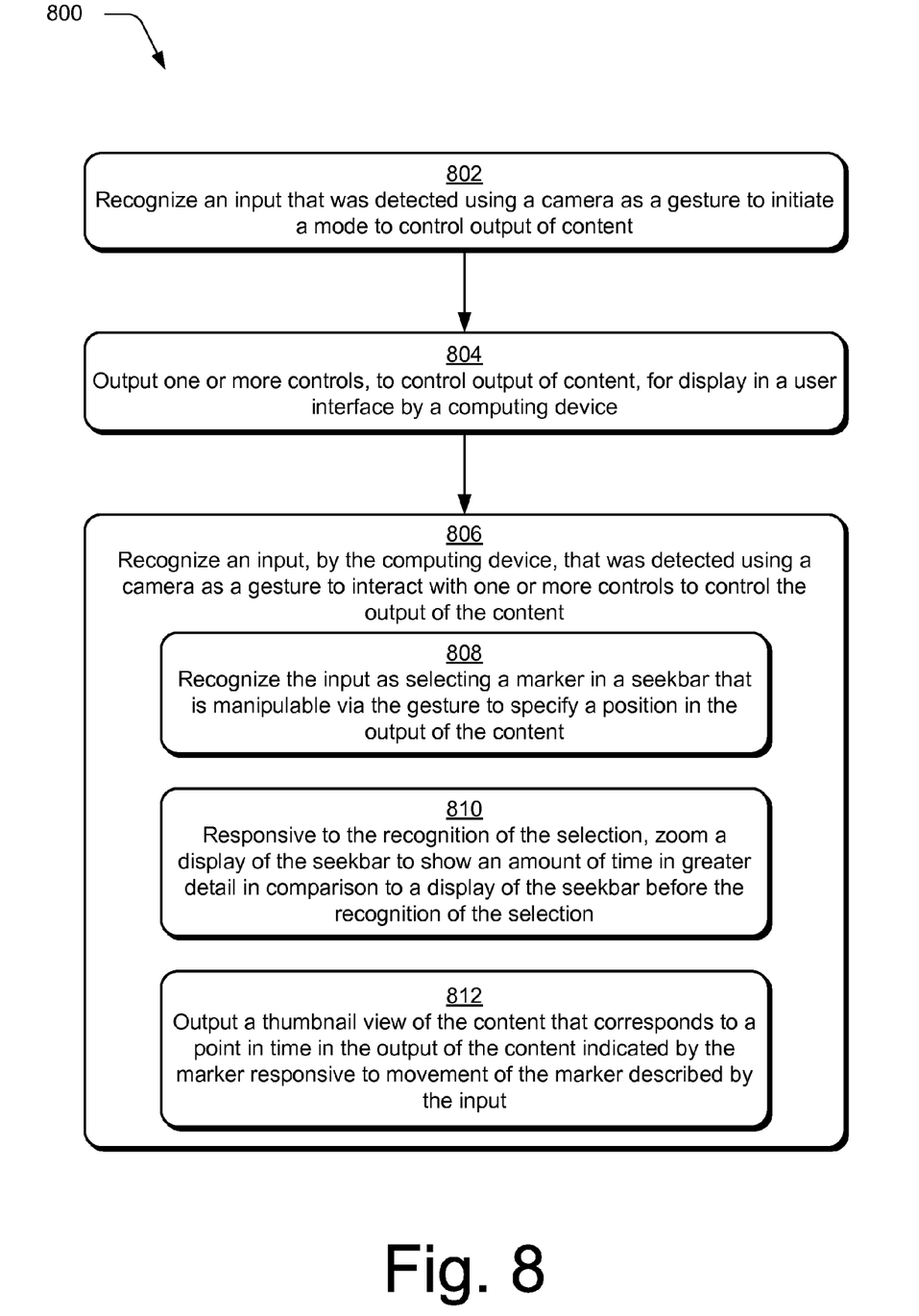
FIG. 8 is a flow diagram depicting a procedure in an example implementation in which one or more gestures are utilized to control media playback by a computing device.

FIG. 8 depicts a procedure 800 in an example implementation in which one or more gestures are utilized to control output of content by a computing device. An input that was detected using a camera is recognized as a gesture by a computing device to initiate a mode to control output of content (block 802). For example, the NUI input device 110 may recognize a movement and/or positioning of one or more parts of a user's body as a gesture. In this instance, the gesture indicates an intention to control output of content such as a book, navigation application, playback of media, and so on.

One or more controls are output to control output of content for display in a user interface by a computing device (block 804). Continuing with the previous example, the one or more controls may be output responsive to recognition of the above gesture. A variety of controls may be output, such as buttons (e.g., a pause button 120, a stop button 122), a seekbar 118, and so on as described above.

An input is recognized, by the computing device, that was detected using a camera as a gesture to interact with one or more controls to control the output of the content (block 806). For instance, the input may be recognized as selecting a marker in a seekbar that is manipulable via the gesture to specify a position in the output of the content (block 808). In another instance, responsive to the recognition of the selection a display of the seekbar is zoomed to show an amount of time in greater detail in comparison to a display of the seekbar before the recognition of the selection (block 810). A thumbnail view of the media may also be output that corresponds to a point in time in the output of the content indicated by the marker responsive to movement of the marker described by the input (block 812). A variety of other examples are also contemplated, such as gestures to press a button, indicate a value, and so on. For example, a user may raise their hand to initiate display of the seekbar 118, move the hand to drag the marker 202 to a desired position in the output of the content 116, and drop the hand to start playback of the media 116 at the position indicated by the marker 202.

Example Device

Figure 9:
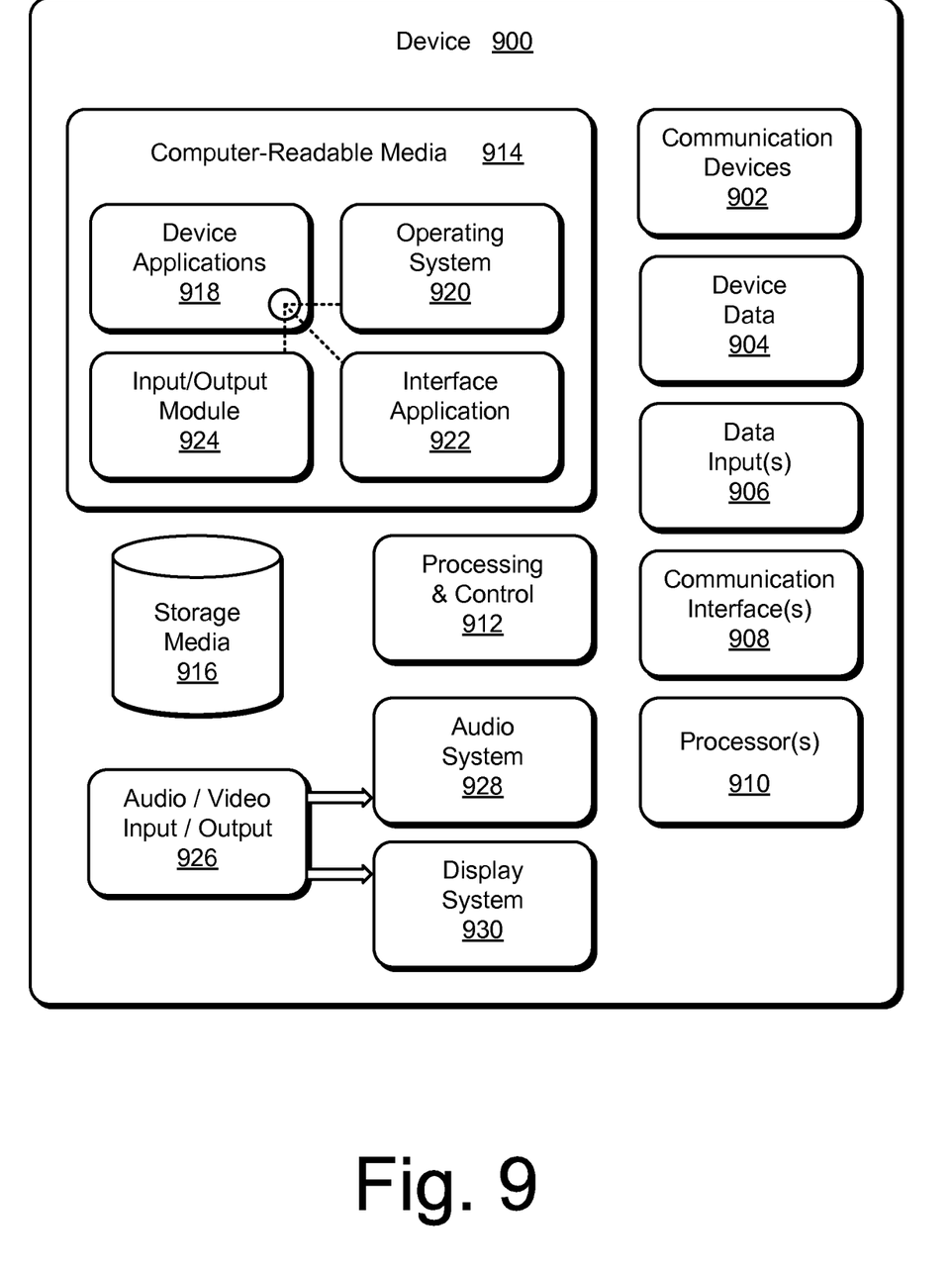
FIG. 9 illustrates various components of an example device that can be implemented as any type of portable and/or computer device as described with reference to FIGS. 1-9 to implement embodiments of the media playback control techniques described herein.

FIG. 9 illustrates various components of an example device 900 that can be implemented as any type of portable and/or computer device as described with reference to FIGS. 1 and 2 to implement embodiments of the gesture techniques described herein. Device 900 includes communication devices 902 that enable wired and/or wireless communication of device data 904 (e.g., received data, data that is being received, data scheduled for broadcast, data packets of the data, etc.). The device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908 that can be implemented as any one or more o\f a serial and/or parallel interface, a wireless interface, any type of network interface, a modem, and as any other type of communication interface. The communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like) which process various computer-executable instructions to control the operation of device 900 and to implement embodiments described herein. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable media 914 provides data storage mechanisms to store the device data 904, as well as various device applications 918 and any other types of information and/or data related to operational aspects of device 900. For example, an operating system 920 can be maintained as a computer application with the computer-readable media 914 and executed on processors 910. The device applications 918 can include a device manager (e.g., a control application, software application, signal processing and control module, code that is native to a particular device, a hardware abstraction layer for a particular device, etc.). The device applications 918 also include any system components or modules to implement embodiments of the gesture techniques described herein. In this example, the device applications 918 include an interface application 922 and an input/output module 924 (which may be the same or different as input/output module 114) that are shown as software modules and/or computer applications. The input/output module 924 is representative of software that is used to provide an interface with a device configured to capture inputs, such as a touchscreen, track pad, camera, microphone, and so on. Alternatively or in addition, the interface application 922 and the input/output module 924 can be implemented as hardware, software, firmware, or any combination thereof. Additionally, the input/output module 924 may be configured to support multiple input devices, such as separate devices to capture visual and audio inputs, respectively.

Device 900 also includes an audio and/or video input-output system 926 that provides audio data to an audio system 928 and/or provides video data to a display system 930. The audio system 928 and/or the display system 930 can include any devices that process, display, and/or otherwise render audio, video, and image data. Video signals and audio signals can be communicated from device 900 to an audio device and/or to a display device via an RF (radio frequency) link, S-video link, composite video link, component video link, DVI (digital video interface), analog audio connection, or other similar communication link. In an embodiment, the audio system 928 and/or the display system 930 are implemented as external components to device 900. Alternatively, the audio system 928 and/or the display system 930 are implemented as integrated components of example device 900.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
outputting one or more controls, to navigate through playback of media, for display in a user interface by a computing device, at least one of the controls being configured as a seekbar having a marker that is manipulable to specify a position in the playback of the media;
recognizing an input, by the computing device, that was detected using a camera as a gesture to approach, without selecting, the marker to navigate through the playback of the media; and
responsive to the approach of the marker, without selecting the marker, to navigate through playback of the media, automatically zoom a display of the seekbar to show an amount of time in greater detail in comparison to a display of the seekbar before the recognizing.

2. A method as described in claim 1, wherein the seekbar includes one or more indicators of points in time in the playback of the media and further comprising positioning the marker, by the computing device, at a corresponding said indicator when the marker is disposed within a defined range of the corresponding said indicator.

3. A method as described in claim 1, further comprising outputting a thumbnail view of the media that corresponds to a point in time in the playback of the media indicated by the marker responsive to movement of the marker described by the input.

4. A method as described in claim 3, wherein output of the media is paused during the movement of the marker.

5. A method as described in claim 1, wherein the one or more controls are configured as a play control, a pause control, a fast forward control, a rewind control, a stop control, a previous chapter control, or a next chapter control.

6. A method as described in claim 1, wherein the gesture involves positioning of one or more body parts of a user.

7. A method as described in claim 1, further comprising recognizing another input as a motion to initiate the outputting of the one or more controls in the user interface.

8. A system comprising:
one or more processors; and
one or more computer-readable hardware storage devices storing computer-executable instructions that are executable by the one or more processors to cause the system to perform operations including:
recognizing an input, by a computing device, that was detected using a camera as a gesture to approach, without selecting, a marker in a seekbar for navigating playback of media, the marker describing a position in the playback of the media described by the seekbar; and
responsive to the recognizing of the input as the gesture to approach the marker in the seekbar, automatically zooming a display of the seekbar by the computing device to display an amount of time in the playback of the media in greater detail that supports selection of the seekbar.

9. The system of claim 8, wherein the amount of time is associated with a current position in the playback of the media described by the marker.

10. The system of claim 8, wherein the amount of time is less than a total duration of the playback of the media described by the seekbar when the marker is not selected.

11. The system of claim 8, wherein the seekbar includes one or more indicators of points in time in the playback of the media and further comprising positioning the marker, by the computing device, at a corresponding said indicator when the marker is disposed within a defined range of the corresponding said indicator.

12. The system of claim 8, further including outputting a thumbnail view of the media that corresponds to a point in time in the playback of the media indicated by the marker responsive to movement of the marker.

13. One or more computer-readable hardware storage devices comprising instructions that, responsive to execution on a computing device, cause the computing device to perform operations comprising:
outputting a seekbar to control playback of media by the computing device;
recognizing a single input that was detected using a camera as a gesture to approach, but not select, a particular point in the playback of the media through interaction with the seekbar, the particular point being approached, but not selected, for navigating through the playback of the media; and
responsive to the recognizing of the single input as a gesture to approach, but not select, the particular point in the playback of the media, automatically zooming a display of the seekbar to show a shorter amount of time in greater detail.

14. One or more computer-readable hardware storage devices as described in claim 13, wherein the seekbar includes one or more indicators of points in time in the playback of the media and wherein the instructions are configured to perform further operations comprising positioning the marker at a corresponding said indicator when the marker is disposed within a defined range of the corresponding said indicator.

15. One or more computer-readable hardware storage devices as described in claim 13, further comprising outputting a thumbnail view of the media that corresponds to a point in time in the playback of the media indicated by the marker responsive to movement of the marker described by the input.

16. One or more computer-readable hardware storage devices as described in claim 13, wherein the gesture involves a unique position of 20 one or more body parts of a user.

17. One or more computer-readable hardware storage devices as described in claim 13, further comprising recognizing another input as a motion to initiate the outputting of the seekbar in the user interface.

18. One or more computer-readable hardware storage devices as described in claim 13 wherein the seekbar includes a marker that is manipulable to specify a position in the playback of the media and a quality meter.

19. One or more computer-readable hardware storage devices as described in claim 13, further comprising providing a thumbnail preview of the media at different positions along the seekbar that correspond to positions of the particular point in the playback of the media.

20. One or more computer-readable hardware storage devices as described in claim 13, further comprising, responsive to recognizing an additional input as a scrub gesture to an edge of the seekbar, automatically scrolling the seekbar to display a section of time that is different than a section corresponding to the shorter amount of time.

* * * * *